Figure 1:
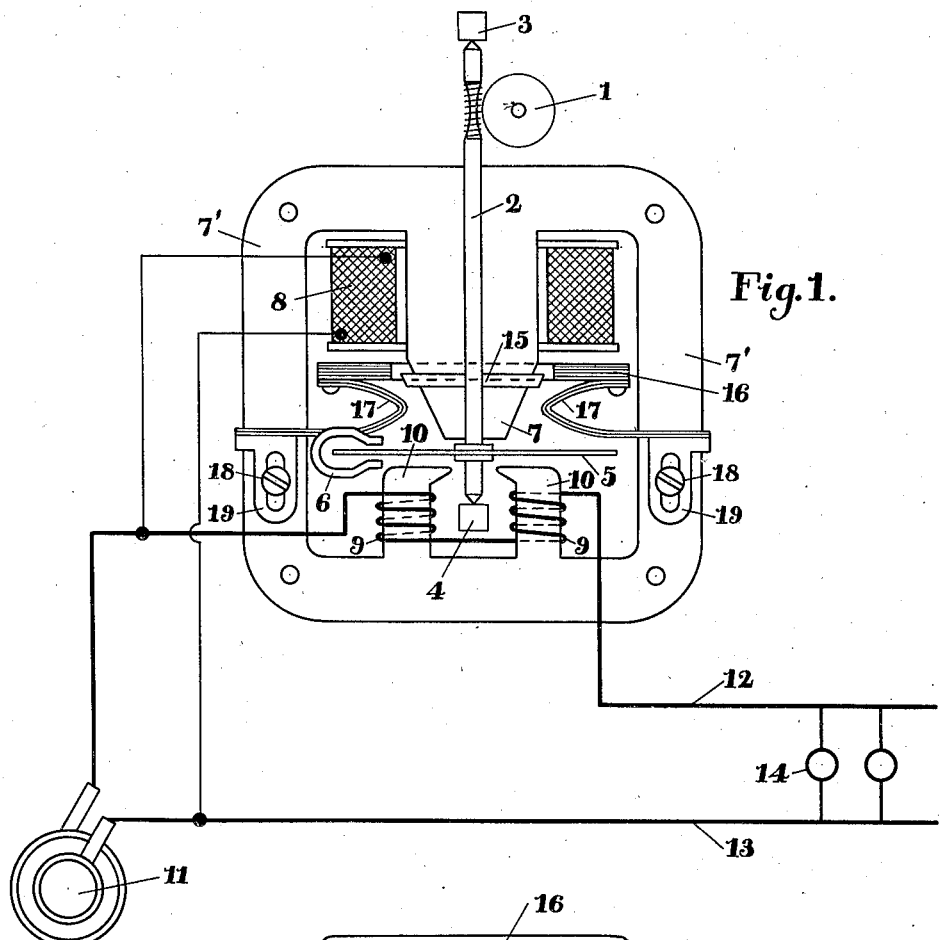

Feb. 2, 1926. 1,571,198
J. HARRIS
INDUCTION ELECTRICITY METER
Filed Sept. 13, 1924  2 Sheets-Sheet 1

INVENTOR
Jesse Harris
BY
ATTORNEY

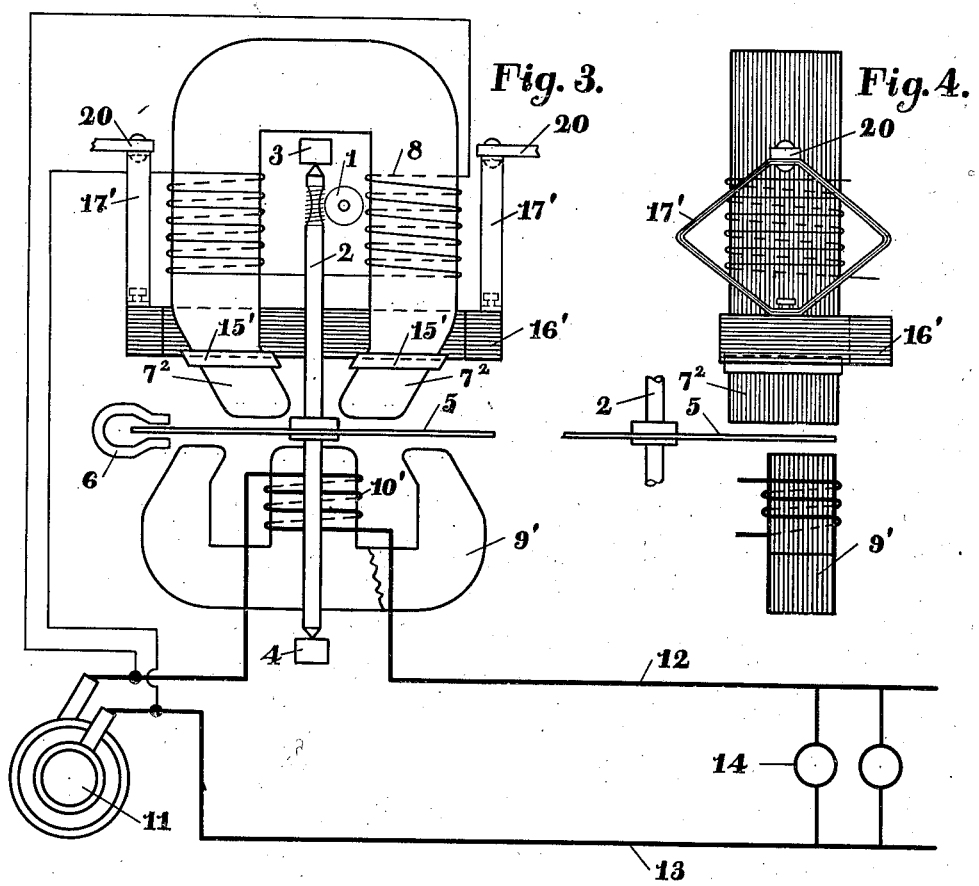

Patented Feb. 2, 1926.

1,571,198

UNITED STATES PATENT OFFICE.

JESSE HARRIS, OF LA FAYETTE, INDIANA, ASSIGNOR TO DUNCAN ELECTRIC MANUFACTURING COMPANY, OF LA FAYETTE, INDIANA, A CORPORATION OF ILLINOIS.

INDUCTION ELECTRICITY METER.

Application filed September 13, 1924. Serial No. 737,454

*To all whom it may concern:*

Be it known that I, JESSE HARRIS, a citizen of the United States, residing at La Fayette, in the county of Tippecanoe and the State of Indiana, have invented a certain new and useful Improvement in Induction Electricity Meters, of which the following is a full, clear, concise, and exact description.

My invention relates to electricity meters and is particularly applicable to induction watthour meters.

Induction watthour meters as ordinarily constructed are open to errors due to changes in temperature, particularly when integrating energy on low power factor circuits. This is due in part to the temperature coefficient of metal used in the construction of such a meter and the losses which result from changes in temperature.

Some of the errors arising from temperature fluctuations are due to change in the pressure flux threading the armature and also to an accompanying change in the phase relation of the current and pressure fields. Means are disclosed in my Patent No. 1,518,196, dated December 9, 1924, for maintaining the phase relation of the current and pressure fields upon change in temperature. By my present invention, means are provided for varying the proportion of the flux due to the pressure winding that passes through the armature as this produced flux rises or falls with change in temperature and thereby preferably maintaining the pressure flux threading the armature substantially constant upon change in temperature. This means desirably also serves to maintain the phase relation of the current and pressure fields constant upon change in temperature.

As is well known, in order to obtain accuracy on inductive loads, the flux of the potential coil must lag just 90 degrees behind the flux of the series coil on a unity power factor circuit.

In watthour meters as at present constructed, correction is sought by introducing into the flux path of the potential element a secondary coil of the proper magnitude to compensate for the effect of the losses in the potential element. The flux due to this secondary coil has sufficiently more than 90 degrees phase displacement. This combined with the flux due to the potential winding, which is displaced less than 90 degrees in phase, produces a resultant that has the effect of the desired quadrature relation.

Unfortunately the condition of balance in the various circuits is only possible at one definite temperature owing to changes in electrical resistance that are due to changes in temperature and arise because of the temperature coefficients of metal in the meter.

In practicing my invention in the preferred way, a thermostatic or thermo-motive element controls the position of a flux diverter with relation not only to the pressure flux threading the armature to maintain the volume of this flux constant upon change in temperature but also to vary the portion of the pressure flux threading the phasing secondary coil or conductor to maintain the phase relation of the current and pressure fields upon change in temperature.

Figure 2:
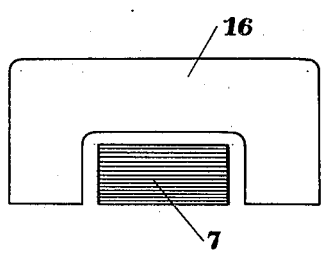

The invention will be more fully explained in connection with the accompanying drawings in which Fig. 1 illustrates one embodiment of the invention, a circuit arrangement being diagrammatically illustrated; Fig. 2 is a plan view of the flux diverter employed in the construction of Fig. 1 showing its relation to the projecting pole of the pressure winding core in this form of meter; Fig. 3 illustrates another embodiment of the invention, a circuit arrangement thereof being diagrammatically indicated; Fig. 4 is a side view of the meter shown in Fig. 3, parts being broken away; and Fig. 5 is a plan view of the flux diverter employed in the construction of Fig. 3 in its relation to the projecting poles of the pressure winding core of this form of meter.

Each meter illustrated includes any suitable integrating or revolution counting mechanism 1 which is operated by the upright meter shaft or spindle 2 suitably supported at its ends in bearings 3, 4. Said spindle carries a closed conductor in the form of a disc 5, preferably made of aluminum. This disc may serve as an armature to constitute a part of the motive element of a damping device which turns in a magnetic field furnished by one or more damping permanent magnets 6, in accordance with common practice, it being common to provide means for automatically adjusting the damping magnet flux upon change in temperature. The armature 5 is preferably also the armature of the motor member of the meter, being subject to potential magnetic flux passing therethrough from the inwardly projecting pressure core or polar portion 7 of the rectangular core 7' in the structure of Fig. 1 or to the flux threading the poles of the U-shaped magnet core 7², in the structure of Fig. 3, these poles in both meters being perpendicular to and on one side of the corresponding armature disc 5 and being provided with shunt or potential windings 8. In Fig. 1, the current coils 9 are wound upon the core portions 10 which are perpendicular to the armature. In Fig. 3 an E-shaped core 9' is likewise perpendicular to its armature disc. The middle leg of this core 9' is wound with a single current winding 10'. In each meter, the pressure winding and core are upon one side of the armature and the current winding and core upon the other, the axis of the armature being, as usual, normally stationary with respect to the motor magnets. Each meter illustrated serves to produce torque proportional to the wattage. The source of current, in each embodiment of the invention illustrated, is an alternating current generator 11. The pressure winding of each meter is connected in parallel with the source 11. The mains 12, 13 in each instance shown, extend from the generator and constitute sides of a working or load circuit. Translating devices 14, such as incandescent lamps, are connected in bridge between the respective mains.

Referring now more particularly to Figs. 1 and 2, the potential winding 8 there shown is in a single coil that surrounds the single pressure core portion 7. A short circuited coil 15 for establishing quadrature between the current and pressure fields is fixed upon this core portion near the tip threof. A flux diverter 16 of laminated iron embraces the core 7 preferably in the region of the coil 15 to so regulate the volume of flux threading said coil as to produce a quadrature relation of the pressure field to the current field. This flux diverter also determines the volume of the flux threading the meter armature. I mount the flux diverter upon the free ends of the thermostatic or thermo-motive members 17, composed, say of a layer of steel and a layer of brass, these members being adjustably attached to the core 7' by means of screws 18 passing through slots 19 in said thermo-motive members into the core. When the temperature rises, the diverter is lowered and when the temperature lowers, the diverter is raised to modify the flux threading the phasing coil 15 sufficiently to maintain quadrature between the pressure and current fields. In order that the diverter may maintain the volume of flux through the armature constant as the temperature fluctuates the tip of the core portion, where this core portion is embraced by the diverter, is tapered toward the armature, the tapering extending upon both sides of the diverter to enable the diverter to function upon either decreasing or increasing temperature. When the diverter is lowered in response to temperature increase, the flux through the armature disc is maintained at its calibrated, normal, volume, reduction in the volume of the flux that would otherwise occur upon rising temperature being prevented. The converse is true upon falling temperature. That is, the diverter is lowered when the temperature is raised to compensate for the reduced flux then produced by the pressure winding by permitting a larger proportion of this flux then produced to flow through the armature. Conversely, the diverter is raised when the temperature is lowered to compensate for the increased flux then produced by the pressure winding by shunting more of this flux from the armature to permit a lesser proportion thereof to pass through the armature, the result in either case being the maintenance of a substantially constant volume of pressure flux through the armature.

In the structure of Figs. 3, 4 and 5, the diverter 16' has the same cooperative relation with the phasing coils 15' and the tapered ends of the core portions 7², as does the diverter 16 with the phasing coil 15 and the tapered pole 7 of the structure of Figs. 1 and 2. There being two tapered poles 7² in the structure of Figs. 3, 4 and 5, there are two phasing coils 15', one upon each pole, the diverter 16' being arranged to embrace both poles 7² and the shading coils thereon. This diverter may be supported from above by two thermostatic or thermo-motive members 17' depending from stationary supports 20.

It will be observed that the elements 16 and 17, and 16' and 17' constitute devices responsive to changes in temperature for varying the reluctance encountered by flux set up by the motor magnet systems of the meters and flowing in paths that shunt the meter armatures.

It will be observed that the adjustable diverter varies the magnetic reluctance in the path followed by a portion of the flux set up by the torque producing magnet system, in this instance the flux portion which flows in a path shunting the meter armature.

Changes may be made without departing from my invention.

Having thus described my invention, I claim:

1. An induction electricity meter including an armature; current and pressure windings in inductive relation to the armature; a device responsive to changes in temperature in controlling relation to the flux due to the pressure winding and serving to maintain the volume of this flux threading the armature substantially constant upon change in temperature; and a conductor in secondary relation to the pressure winding for establishing phase relation between the current and pressure fields and positioned to have the flux therethrough varied by said device to maintain the phase relation between the current and pressure fields upon change in temperature.

2. An induction electricity meter including an armature; current and pressure windings in inductive relation to the armature; a flux diverter; a thermo-motive element regulating the position of said flux diverter to maintain the flux due to the pressure winding that the threads the armature substantially constant upon change in temperature; and a conductor in secondary relation to the pressure winding for establishing phase relation between the current and pressure fields and positioned to have the flux therethrough varied by said diverter to maintain the phase relation between the current and pressure fields upon change in temperature.

3. An induction electricity meter including an armature; current and pressure windings in inductive relation to the armatures; a device responsive to changes in temperature in controlling relation to the flux due to the pressure winding and serving to maintain this flux threading the armature substantially constant upon change in temperature; and a conductor in secondary relation to the pressure winding for establishing phase relation between the current and pressure fields and positioned to have the flux therethrough varied by said device to maintain the phase relation between the current and pressure fields upon change in temperature.

4. An induction electricity meter including an armature; current and pressure windings in inductive relation to the armature; a flux diverter of magnetizable material arranged in conjunction with the pressure winding to divert flux produced by the pressure winding from the armature; and a thermo-motive element regulating the position of said flux diverter and operating upon increase in temperature to move the diverter to a position permitting a larger proportion of the flux then produced by the pressure winding to flow through the armature and also operating upon decrease in temperature to move the diverter to a position in which the diverter reduces the proportion of this flux that passes through the armature.

5. An induction electricity meter including an armature; current and pressure windings in inductive relation to the armature; and a device responsive to changes in temperature and related to the flux produced by the pressure winding for determining the proportion of this flux which passes through the armature and operating to increase the proportion of this flux passing through the armature upon increase in temperature and to decrease the proportion of this flux passing through the armature upon decrease in temperature.

6. An induction electricity meter including an armature; current and pressure windings in inductive relation to the armature; a flux diverter of magnetizable material arranged in conjunction with the pressure winding to divert flux produced by the pressure winding from the armature; and a thermo-motive element regulating the position of said flux diverter in response to temperature changes to change the proportion of the flux produced by the pressure winding that passes through the armature.

7. An induction electricity meter including a turning armature; current and pressure windings in inductive relation to the armature and stationary with relation to its axis; and a device responsive to changes in temperature and related to the flux produced by the pressure winding for determining the proportion of this flux which passes through the armature and operating to change the proportion of the flux produced by the pressure winding passing through the armature upon change in temperature.

8. An induction electricity meter including an armature; current and pressure windings in inductive relation to the armature; a device responsive to changes in temperature in controlling relation to the flux due to the pressure winding and serving to change the proportion of this flux threading the armature upon change in temperature; and a conductor in secondary relation to the pressure winding for establishing phase relation between the current and pressure fields and positioned to have the flux therethrough varied by said device to maintain the phase relation between the current and pressure fields upon change in temperature.

9. An induction electricity meter including an armature; current and pressure windings in inductive relation to the armature; a diverter for flux due to the pressure winding; a thermo-motive element regulating the position of said flux diverter to change the proportion of the flux due to the pressure winding that threads the armature upon change in temperature; and a conductor in secondary relation to the pressure winding for establishing phase relation between the current and pressure fields and positioned to have the flux therethrough varied by said diverter to maintain the phase relation between the current and pressure fields upon change in temperature.

10. An induction electricity meter including an armature; current and pressure windings in inductive relation to the armature; a magnetic diverter for flux due to the pressure winding; a device responsive to change in temperature and serving to vary the proportion of the pressure flux diverted by the diverter to change the proportion of the flux due to the pressure winding that threads the armature upon change in temperature; and a conductor in secondary relation to the pressure winding for establishing phase relation between the current and pressure fields and positioned to have the flux therethrough varied by said diverter to maintain the phase relation between the current and pressure fields upon change in temperature.

11. An induction electricity meter including an armature; current and pressure windings in inductive relation to the armature; a flux diverter of magnetizable material arranged in conjunction with the pressure winding to divert flux produced by the pressure winding from the armature; and a device responsive to change in temperature for varying the proportion of the pressure flux diverted by the diverter to change the proportion of the pressure flux that passes through the armature.

12. An induction electricity meter including a torque producing magnet system having current and pressure windings, and a thermo-motive device responsive to changes in temperature for varying the reluctance encountered by flux set up by said magnet system.

13. An induction electricity meter including a torque producing magnet system having current and pressure windings, and a thermo-motive device responsive to changes in temperature for varying the reluctance encountered by flux set up by said magnet system and flowing in a path that shunts the meter armature.

14. An induction electricity meter including a turning armature; current and pressure windings in inductive relation to the armature and stationary with relation to its axis; and a thermo-motive device responsive to changes in temperature and operating to change the proportion of the flux produced by the pressure winding passing through the armature upon change in temperature.

In witness whereof, I hereunto subscribe my name.

JESSE HARRIS.